Sept. 8, 1970          M. C. O'DONNELL          3,527,427

FILM TRANSPORT CONTROL DEVICE

Filed Feb. 3, 1969          2 Sheets-Sheet 1

MILES C. O'DONNELL
INVENTOR.

BY *William C. Dixon, III*

*Robert W. Hampton*
ATTORNEYS

United States Patent Office 3,527,427
Patented Sept. 8, 1970

3,527,427
FILM TRANSPORT CONTROL DEVICE
Miles C. O'Donnell, Rochester, N.Y., assignor to Eastman Kodak Company, Rochester, N.Y., a corporation of New Jersey
Filed Feb. 3, 1969, Ser. No. 795,836
Int. Cl. B11b *15/32;* G03b *1/04*
U.S. Cl. 242—205          10 Claims

ABSTRACT OF THE DISCLOSURE

In an apparatus having a mechanism capable of bimodal operation and having a movable cover member, a device is provided for shifting the mechanism from one mode of operation to the other. In the preferred embodiment, the apparatus is a motion-picture projector operatable in a projection mode of operation and a film-rewind mode of operation and having a cover member movable from an open position to a closed position, the device being operative, in response to movement of the cover member from its open position to its closed position, to shift the projector mechanism from the film-rewind mode to the projection mode.

BACKGROUND OF THE INVENTION

Field of the invention

This invention relates generally to a device for shifting a mechanism in an apparatus from one mode of operation to another, and particularly to a device for shifting the drive mechanism of a motion-picture projector from its film-rewind mode to its projection mode.

Description of the prior art

In an apparatus capable of bimodal operation, such as a motion-picture projector or a tape recorder, means for manually shifting a mechanism therein from one mode of operation to the other are known. With regard to a motion-picture projector, it is known to provide a manually actuatable control member to shift the projector drive mechanism from a projection mode of operation to a film-rewind mode and back to the projection mode. Purely manual devices of this type present the obvious problem of requiring the projector operator to determine the setting of the device before using the projector in either mode of operation. In a projector of the kind having a closure movable from an open position, in which the projector is operable, to a closed position, in which the projector is rendered more convenient for storage and handling, this problem is especially serious in that the manual control member may inadvertently be left in its rewind setting, unnoticed by the operator when he closes the projector for storage before using it again at a later time. In such event, inconvenience to the operator and possible damage to the film being used may result from an attempt to use the projector for projection when its drive mechanism is still set for the film-rewind mode of operation. A simple and inexpensive device for preventing such an occurrence is highly desirable. No such device, for use with manually controllable shifting mechanisms in motion-picture projectors, is taught, shown, or suggested by the prior art known to applicant.

SUMMARY OF THE INVENTION

Accordingly, an object of the present invention is to provide a simple, low-cost device for shifting a mechanism in an apparatus from one mode of operation to another upon manual movement of a member on the apparatus that normally precedes and follows operation of the apparatus. Another object of the invention is to provide such a device for shifting the drive mechanism in a motion-picture projector from its film-rewind mode of operation to its projection mode upon manual movement of a closure member on the projector to its closed position. A further object of the invention is to provide a device of the type described with reference to a motion-picture projector at a minimum cost of manufacture in order to realize the benefits obtainable from such a device in relatively inexpensive motion-picture projectors intended for the amateur motion-picture market.

To meet these and other objects, the present invention provides a device for shifting a bimodally operatable mechanism from one mode of operation to another in an apparatus used for reproducing signal information stored on a strip of material that is transportable in a supply direction from a movably supported supplying member to a movably supported receiving member and transportable in a return direction from the receiving member to the supplying member, the apparatus having first means for transporting the strip in the supply direction; second means operatively engageable with the supplying member for transporting the strip in the return direction; third means actuatable in first and second directions for operatively engaging and disengaging, respectively, the second means with and from, respectively, the supplying member; a body member; and a closure member movable, relative to the body member, from a first position to a second position. The device comprises means on one of said body member and said closure member engageable by the other of said body member and said closure member in response to movement of said closure member from said first position to said second position for effecting actuation of said third means in said second direction to operatively disengage said second means from said supplying member, whereby said second means is operatively disengaged from said supplying member automatically in response to movement of said closure member from said first position to said second position.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because certain parts of photographic and related apparatus are well known, the following description is directed in particular to those elements forming, or cooperating directly with, the present invention, elements that are not specifically shown or described herein being understood to be selectable from those known in the art.

FIGS. 1-4 of the drawings illustrate the preferred embodiment of the present invention as it could be incorporated in a motion-picture projector whereby closing of the projector cover assures that projector operation is changed from the film-rewind mode to the projection mode if such change has not already been manually accomplished by the projector operator.

Figure 1:
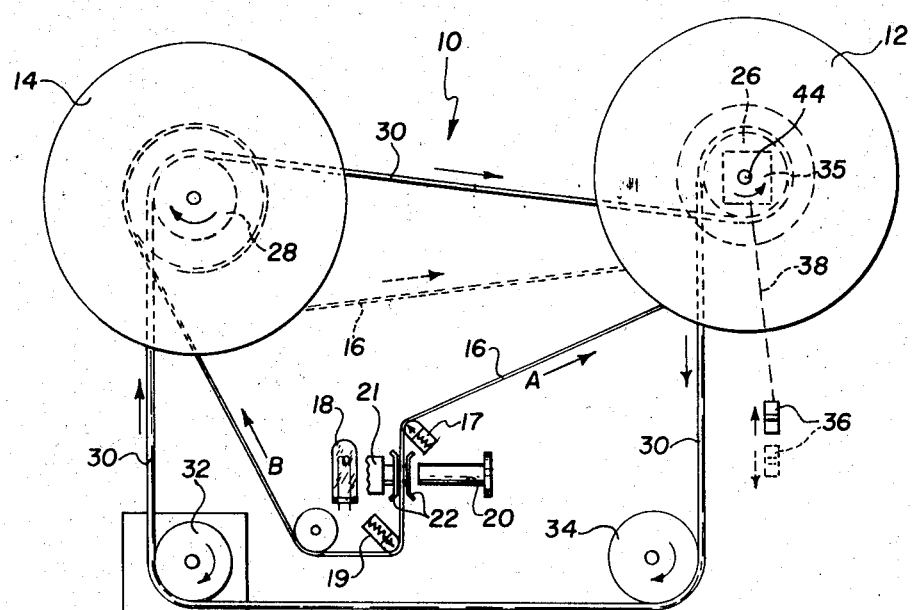
FIG. 1 is a schematic view of a motion-picture projector in which the present invention may be incorporated.

FIG. 1 shows schematically a motion-picture projector 10 rotatably supporting a supply reel 12 and a takeup reel 14. Shown in solid lines between reels 12 and 14 is a film 16 as it is moved from reel 12 through projector 10 to reel 14 during the projection mode of projector operation. Shown in broken lines between the two reels is film 16 as it is moved from reel 14 directly to reel 12 during the film-rewind mode of projector operation. Projector 10 includes an illuminating lamp 18 and a lens system 20, the film being driven therebetween by a film pull-down mechanism 21 in the region of a film gate 22 that holds the film in flat, focal alignment with the lens system 20. Assisting the movement of film 16 through gate 22 are a pair of film snubbers 17 and 19 arranged as shown. Also provided is a shutter mechanism (not shown) so that film 16 is viewed only during moments when it is held in gate 22.

Reels 12 and 14 are rotatively driven by a drive motor 24 coupled to a motor drive pulley 32 which drives pulleys 28 and 26 by means of a belt or spring cable 30. As shown in FIG. 1, the direction of rotation of drive pulley 32 is clockwise, so that the belt or cable 30 will also follow a generally clockwise path of travel. As can be seen, this results in clockwise rotation of take-up reel 14 and, because cable 30 is crossed once around pulley 26, counterclockwise rotation of supply reel 12. Included, but not shown, in the hub portion of each of the pulleys 28 and 26 is a slip clutch designed to slip when a predetermined maximum drive torque has been imposed thereon. Such rotation of reels 14 and 12 in opposite directions through the slip clutches provides what is known in the art as a tendency type of drive, as described more fully, for example, in U.S. Pat. No. 3,310,251, issued Mar. 21, 1967 in the name of Robert B. Johnson and entitled Reel Drive Mechanism. The tendency drive places film 16 in constant tension, as indicated by the arrows A and B, when the projector is operating in its projection mode. As will be seen, an idler pulley 34 is also provided to facilitate the return of belt or cable 30 from pulley 26 to pulley 32.

As is well known in the motion-picture-projector art, continued operation of the projector in its projection mode results in the unwinding of film 16 from supply reel 12 and the winding of film 16 onto take-up reel 14 until all of the film has been so transferred, by which time the projection mode of operation has been completed. To effect rewinding of film 16 onto supply reel 12, the outer end of film 16 on reel 14 must be fastened to the core of reel 12 and reel 12 then driven counterclockwise.

It is to be noted that, in the projection mode of operation in a projector of the type herein illustrated, the film 16 is moved from supply reel 12 through gate 22 and onto take-up reel 14 by the aforementioned film pull-down mechanism, the pulley drive system and slip clutches serving only to maintain film 16 in tension, as explained in the cited patent. Because the slip clutches are designed to slip at a very low level of torque, such as, for example, that needed to provide approximately one ounce of tension in the film, the tendency drive arrangement described is inadequate to supply the drive torque to supply reel 12 that is necessary to effect complete rewinding of film 16 thereon.

Hence, a less limited drive arrangement is needed to rotate reel 12 during the film-rewind mode of operation. This is accomplished by bypassing the slip clutch associated with pulley 26 by means of another clutch 35 which positively couples pulley 26 to the spindle 44 on which reel 12 is supported, such a positive-drive clutch being illustrated in the cited patent. Upon engagement of the positive-drive clutch 35, cable 30 is thus able to drive supply reel 12 with sufficient torque to completely rewind film 16 thereon. Engagement and disengagement of clutch 35 can be effected through a conventional type of shifting linkage 38 actuable by a manual control member such as button 36, the shifting linkage 38 between clutch 35 and button 36 being shown schematically by the broken line so numbered in FIG. 1, button 36 is shown in solid lines in its upper position wherein clutch 35 is disengaged to enable projector 10 to operate in the projection mode, and is shown in broken lines in its lower position wherein clutch 35 is engaged to enable projector 10 to operate in the film-rewind mode.

Figure 2:
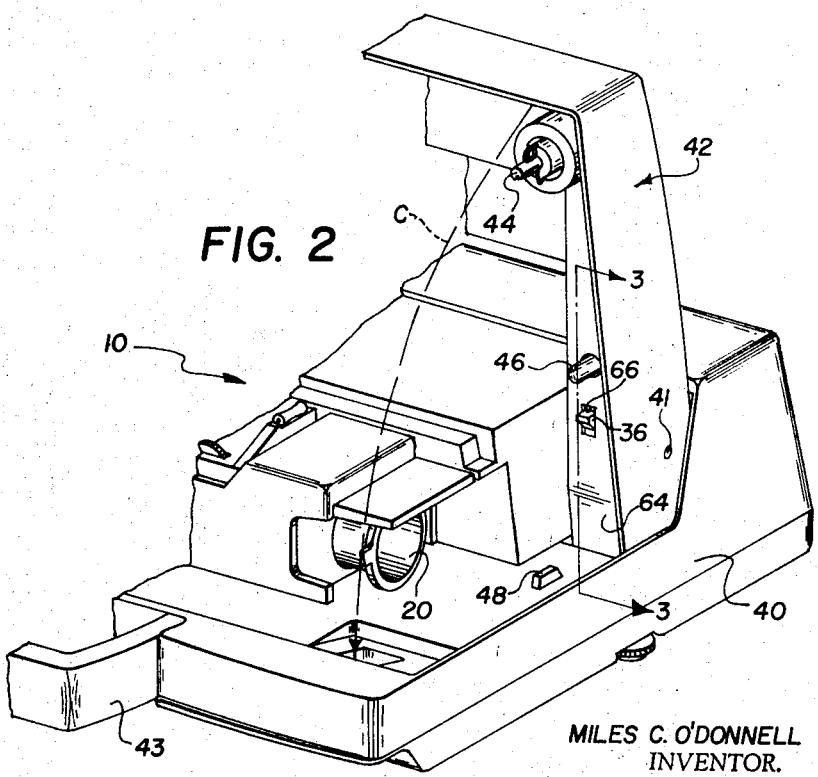
FIG. 2 is a partial view, in perspective, of a motion-picture projector having a movable closure in which the device of the present invention is incorporated.

FIG. 2 illustrates the front portion of a motion-picture projector of the type illustrated schematically in FIG. 1 wherein the present invention is incorporated, like parts being designated by like reference numerals in both figures. In FIG. 2, projector 10 is shown as comprising a projector base or body 40 on which a cover or closure 42 is mounted for rotation about a pivot 41. Closure 42 is shown in its open position, in which projector 10 is operable. Counterclockwise rotation of closure 42 from its open position, as indicated by arrow C in FIG. 2, moves closure 42 to its closed position, in which projector 10 is rendered more suitable for storage or carrying by handle 43. The lens system 20 and, although not shown in FIG. 2, the film gate, film pull-down mechanism, illuminating lamp, and film snubbers are all mounted on the projector base or body 40. Shown in the upper-right-hand corner of closure 42 is the spindle 44 on which supply reel 12 is supported during operation of the projector. Although not shown in FIG. 2, a similar spindle for supporting take-up reel 14 is provided in the upper-left-hand corner of closure 42.

The tendency-drive and positive-drive mechanisms are as described with reference to FIG. 1. Thus spindle 44 is caused, by the drive motor and cable arrangement, to rotate in the counterclockwise direction, as viewed in FIG. 2, the tendency-drive and positive-drive clutches associated with spindle 44 being incorporated within closure 42 behind the exposed portion of spindle 44. Shown near the bottom of closure 42, protruding through an opening 66 in wall 64 of closure 42, is manual control button 36 in its lower position, wherein the positive-drive clutch is engaged to enable projector 10 to operate in the film-rewind mode.

As described hereinabove, after projection of the film provided on a supply reel has been completed, the projector operator effects rewinding of the projected film onto the supply reel by connecting the outer end of the film on the take-up reel to the core of the supply reel and by then moving button 36 to its lower position, thereby manually shifting the projector from its projection mode to its film-rewind mode. On so rewinding the last film to be used on a given occasion, the operator then normally removes both the supply and take-up reels, moves button 36 back to its upper position to return the projector to its projection mode, and then moves closure 42 to its closed position so that the projector may be stored until it is to be used again.

To avert the possibility that the projector operator may inadvertently leave the projector stored with button 36 in its lower position, resulting in subsequent attempted film projection while the projector is still in its rewind mode of operation, the present invention is provided. In the present invention, a releasing actuation member is provided to effect the return of button 36 and hence the return of shifting linkage 38 to their upper position to thereby shift the projector drive mechanism to its projection mode automatically upon closing of closure 42. A portion of such a releasing actuation member is shown in FIG. 2 at 46, such portion being brought into engagement with an engaging portion such as projection 48 on body 40, as will be more fully described below with reference to FIGS. 3 and 4.

Figure 3:
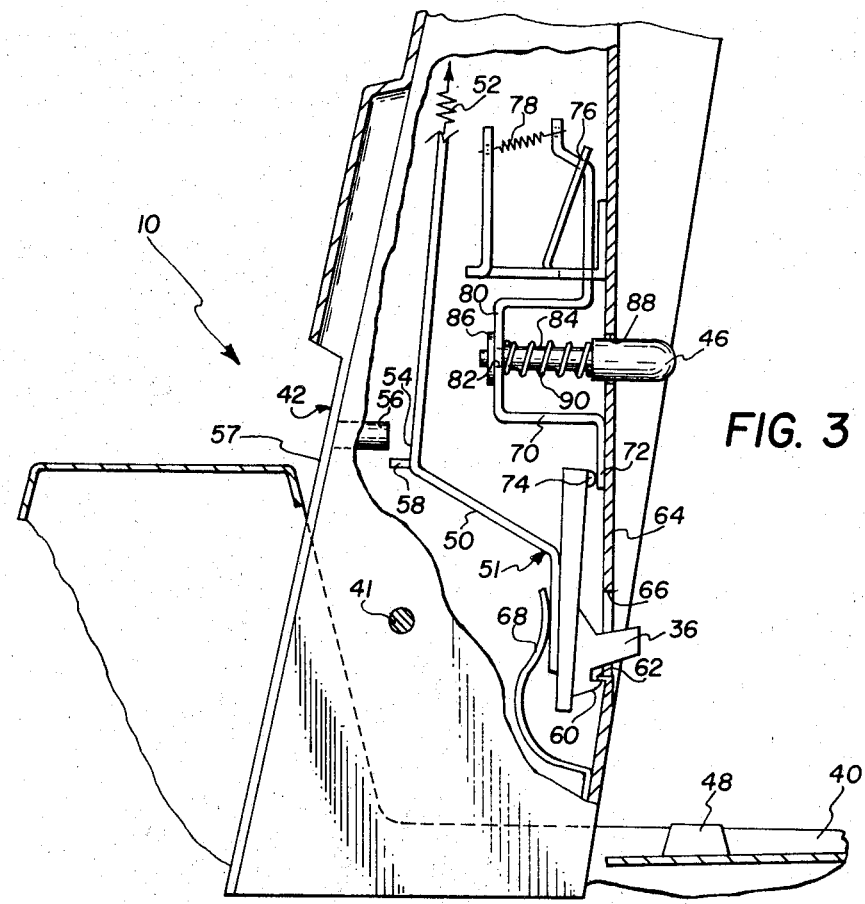
FIG. 3 is an enlarged, fragmentary, sectional view of the projector shown in FIG. 2, taken along line 3—3 of FIG. 2, illustrating the preferred embodiment as it appears with the closure in its open position.
Figure 4:
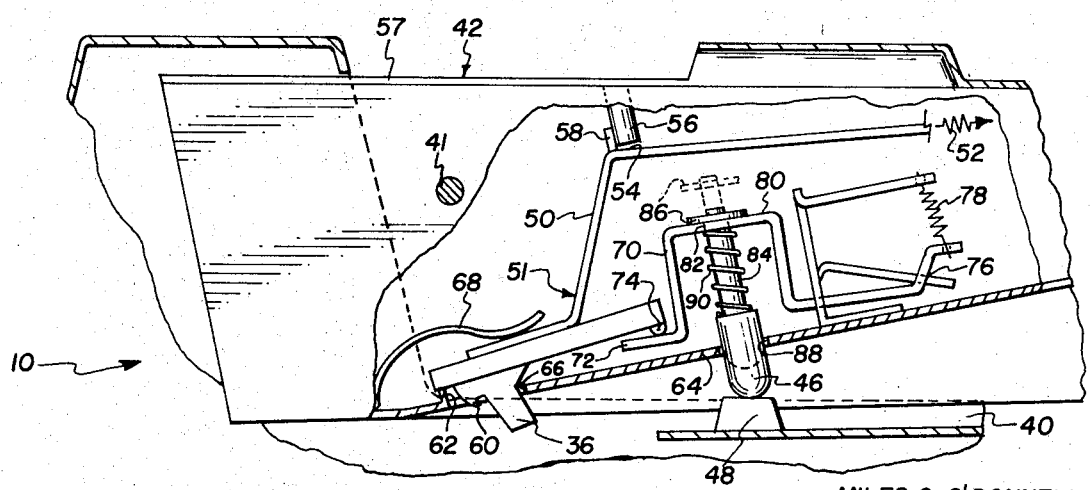
FIG. 4 is an enlarged, fragmentary, sectional view of the projector shown in FIG. 2, similar to that of FIG. 3 but illustrating the preferred embodiment as it appears with the closure in its closed position.

FIGS. 3 and 4 are enlarged, fragmentary, sectional views of the projector illustrated in FIG. 2, showing the details of the preferred embodiment incorporated therein. FIG. 3 is a sectional view taken along line 3—3 of FIG. 2, showing a portion of projector 10 with closure 42 in its open position, i.e., open for projector operation. As mentioned previously, closure 42 is mounted for rotation, about pivot 41, from its open position to a closed position relative to the projector base or body 40. FIG. 4 is similar to FIG. 3 but shows closure 42 after it has been rotated by the projector operator to its closed position.

Referring now to FIG. 3, control button 36 is shown latched in its lower position, wherein the positive-drive clutch 35 associated with supply reel 12 is engaged to enable the projector to operate in its film-rewind mode. Button 36 is fixed to an angled member 50 which is coupled by shifting linkage 38 to clutch 35. Button 36 and member 50 together comprise a shifting member 51 for shifting clutch 35 into and out of engagement with spindle 44 on which supply reel 12 is supported. Shown biasing member 50 in an upward direction, as viewed in FIG. 3, toward clutch 35, is a spring 52 or other biasing means tending to move shifting member 51 in a direction effecting the disengagement of clutch 35. Shifting member 51 is movable to the left, as viewed in FIG. 3, until portion 54 of member 50 abuts stop 56, which is fixed to a wall 57 of closure 42. Shifting member 51 is then movable in an upward direction until tab 58 on member 50 abuts stop 56.

To retain shifting member 51 in its lower position, illustrated in FIG. 3, and thereby maintain the projector in its film-rewind mode of operation, a latching means is provided comprising a latching projection 60 on button 36 that is engageable with a tab 62 at the lower end of opening 66 in wall 64 of closure 42. To move shifting member 51 from its lower position to its upper position, the projector operator need only depress button 36 to the left, against the influence of a spring or other biasing means 68 tending to urge member 51 to the right, until projection 60 clears the edge of tab 62 and then allow spring 52 to urge shifting member 51 upward. Once in its upper position, member 51 is urged to the right by spring 68 so that projection 60 will then protrude through opening 66, as shown in FIG. 4. Such is the manner in which the projector operator would manually shift the projector drive mechanism from its film-rewind mode to its projection mode. Conversely, to shift the mechanism from its projection mode to its rewind mode, the operator need only depress button 36 downward, against the influence of spring 52, and then to the left, against the influence of spring 68, until projection 60 becomes engaged with tab 62, thereby latching shifting member 51 in its lower, or rewind, position.

To perform the function of actuating the release of shifting member 51 from its latched, rewind position automatically in response to closing of closure 42, a releasing actuation member 70 is provided. Releasing actuation member 70 has an end portion 72 in operative engagement with an extended portion 74 of button 36. Member 70, near its opposite end, is pivotally supported by a fulcrum 76 fixed to wall 64, whereby member 70 is pivotable about fulcrum 76 in a clockwise direction to effect leftward movement of end portion 72 and, therefore, extended portion 74. Such leftward movement of extended portion 74, in combination with the upward-biasing influence of spring 52, causes projection 60 to clear the edge of tab 62 in the same manner as does manual leftward movement of button 36. When button 36 is in its latched position, as shown in FIG. 3, end portion 72 abuts the inner surface of wall 64, as is assured by the biasing influences of spring 68 and a spring 78 urging lever 70 in a counterclockwise direction, spring 78 also serving to prevent vibration of member 70.

In a centrally located, U-shaped portion 80 of member 70 is an opening 82 through which a pin 84 protrudes. Preventing axial movement of pin 84 to the right is a retaining washer 86 secured to the left end of pin 84. Attached to the right end of pin 84 is an abutment member 46 which protrudes through an opening 88 in wall 64. Tending to urge pin 84 and member 46 rightward through opening 88 is a compression spring 90. As will be apparent, a force exerted upon member 46 in the leftward direction will tend to move member 46 and pin 84 to the left. Spring 90 is sufficiently stiff to resist being compressed until a predetermined force upon member 46 has been reached, so that leftward movement of member 46 and pin 84 will effect clockwise rotation of member 70 and thereby move button 36 to the left to release shifting member 51 from its latched position.

In accordance with the present invention, the release of shifting member 51 in this manner can be effected by moving closure 42 to its closed position. As shown more clearly in FIG. 4, such movement of closure 42 brings member 46 into engagement with projection 48 on base 40, such engagement of member 46 by projection 48 being effective to move member 46 and pin 84 in a generally upward direction, as viewed in FIG. 4, and thereby rotate member 70 in a clockwise direction to unlatch shifting member 51 as previously described. Spring 90, already mentioned, is sufficiently stiff to resist being compressed during the unlatching of member 51, but is compressible to enable member 46, pin 84, and washer 86 to move, relative to member 70, to their position shown in broken lines, and thereby avoid possible damage to members 70, 51, and 68, in the event of overtravel of member 46 and pin 84 during the final closing movement of closure 42. FIG. 4 illustrates the positions of the various members comprising the present invention as they appear after shifting member 51 has been unlatched and then moved by spring 52 to disengage the positive-drive clutch 35, whereby button 36 occupies its position wherein the projector drive mechanism is set to operate in its projection mode. Subsequent opening of closure 42 to its operable position simply permits member 46, pin 84, and member 70 to be rotated as a unit counterclockwise about fulcrum 76 until end portion 72 of member 70 abuts the inner surface of wall 64, as shown in FIG. 3 but with shifting member 51 remaining in its clutch-disengaged, projection-mode position.

Thus it can be seen that, by means of the present invention, a simple and inexpensive device has been provided to shift a drive mechanism from one mode of operation to another automatically in response to movement of a closure member from one position to another, thereby averting possible difficulties that may otherwise result. As should be apparent to those skilled in the art, the device described herein as being incorporated in a motion-picture projector, for the purpose of shifting the projector drive mechanism from its film-rewind mode of operation to its projection mode upon movement of a closure member to its closed position, could as well be employed in other types of bimodally operatable apparatus, such as a tape recorder, whereby a mechanism in such apparatus may be shifted from one mode of operation to another upon movement of a member on the apparatus that normally precedes or follows the intended use of the apparatus. Hence, while the invention has been described in detail with particular reference to the preferred embodiment thereof, it will be understood that variations and modifications can be effected within the spirit and scope of the invention.

I claim:

1. In an apparatus for reproducing signal information stored on a strip of material transportable in a supply direction from a movably supported supplying member to a movably supported receiving member and transportable in a return direction from the receiving member to the supplying member, the apparatus having:

(a) first means for transporting the strip in the supply direction;

(b) second means operatively engageable with the supplying member for transporting the strip in the return direction;

(c) third means actuatable in first and second directions for operatively engaging and disengaging, respectively, the second means with and from, respectively, the supplying member;

(d) a body member; and (e) a closure member movable relative to the body member from a first position to a second position;

the improvement comprising:

(f) means on one of said body member and said closure member engageable by the other of said body member and said closure member in response to movement of said closure member from said first position to said second position for effecting actuation of said third means in said second direction to operatively disengage said second means from said supplying member;

whereby said second means is operatively disengaged from said supplying member automatically in response to movement of said closure member from said first position to said second position.

2. The improvement claimed in claim 1 wherein the apparatus is a motion-picture projector for projecting photographic images from a moving strip of film onto a viewing surface; wherein the supplying and receiving members are rotatably supported film-supply and film-take-up reels, respectively; wherein during film transport in the supply direction the film is unwound from the supply reel and wound upon the take-up reel; and wherein during film transport in the return direction the film is unwound from the take-up reel and rewound upon the supply reel.

3. The improvement claimed in claim 2 wherein the first means includes a film pull-down mechanism; wherein the second means includes a motor and a clutch member, the motor being in driving engagement with the clutch member; wherein the third means includes a shifting member coupled to the clutch member and means for biasing the shifting member in the second direction, the shifting member being actuatable manually in the first direction to operatively engage the clutch member with the supply reel and actuatable by the biasing means in the second direction to operatively disengage the clutch member from the supply reel; and wherein the closure member is pivotally mounted on the body member for rotational movement from the first position in which the projector is open for operation to the second position in which the projector is closed.

4. The improvement claimed in claim 3 wherein said actuation effecting means is on said closure member and is engageable by an engaging portion of said body member in response to movement of said closure member from said first position to said second position to effect actuation of said shifting member by said biasing means in said second direction and thereby operatively disengage said clutch member from said supply reel.

5. The improvement claimed in claim 4 wherein said shifting member is actuatable manually in said first direction from a first location in which said clutch member is operatively disengaged from the supply reel to a second location in which said clutch member is operatively engaged with the supply reel, said shifting member being actuatable by said biasing means in said second direction from said second location to said first location; wherein the improvement further comprises means for releasably latching said shifting member in said second location; and wherein said actuation effecting means includes an actuation member movably mounted on said closure member, said actuation member having a first portion operatively engaged with said shifting member in said second location and a second portion engageable by said engaging portion of said body member in response to movement of said closure member from said first position to said second position, said actuation member being movable upon engagement of said second portion by said engaging portion to release said shifting member from said second location and thereby enable said biasing means to actuate said shifting member in said second direction to said first location.

6. In a motion-picture projector operatable in a projection mode of operation and a film-rewind mode of operation and having a body member and a closure member movable relative to the body member from an open position to a closed position, the improvement comprising:

(a) first means for shifting the projector from the projection mode of operation to the film-rewind mode of operation; and (b) second means operatively connected to said first means and actuatable in response to movement of said closure member from said open position to said closed position for shifting the projector from the film-rewind mode of operation to the projection mode of operation.

7. The improvement claimed in claim 6 wherein said first means includes a shifting member movable from a first location in which the projector is in the projection mode of operation to a second location in which the projector is in the film-rewind mode of operation; and wherein the improvement further comprises means for releasably latching said shifting member in said second location.

8. The improvement claimed in claim 7 wherein said second means includes:

(a) means for biasing said shifting member from said second location to said first location; and (b) a releasing member movably supported on one of said body member and said closure member, said releasing member having a first portion operatively engaged with said shifting member in said second location and a second portion operatively engageable by the other of said body member and said closure member in response to movement of said closure member from said open position to said closed position, said releasing member being movable upon operative engagement of said second portion by said other member to release said shifting member from said second location and thereby enable said biasing means to move said shifting member to said first location.

9. The improvement claimed in claim 8 wherein said releasing member is movably supported on said closure member; and wherein said second portion of said releasing member is operatively engageable by said body member in response to movement of said closure member from said open position to said closed position.

10. The improvement claimed in claim 9 wherein said shifting member, said latching means, and said biasing means are on said closure member and move with said releasing member during movement of said closure member from said open position to said closed position.

References Cited
UNITED STATES PATENTS

| | | | |
|---|---|---|---|
| 2,907,532 | 10/1959 | Briskin et al. | 242—205 |
| 3,063,651 | 11/1962 | Becker et al. | 242—205 |
| 3,074,662 | 1/1963 | Herman | 242—205 |
| 3,159,841 | 12/1964 | Castedello et al. | 242—205 X |
| 3,310,251 | 3/1967 | Johnson | 242—207 |

LEONARD D. CHRISTIAN, Primary Examiner

U.S. Cl. X.R.

352—178